United States Patent
Bonvolanta et al.

(10) Patent No.: US 10,506,296 B2
(45) Date of Patent: *Dec. 10, 2019

(54) SYSTEM AND METHOD FOR PROCESSING COMMERCE EVENTS

(71) Applicant: AT&T INTELLECTUAL PROPERTY I, L.P., Atlanta, GA (US)

(72) Inventors: Anthony Bonvolanta, Chicago, IL (US); Roland Noll, San Antonio, TX (US); Scott Alan Pettit, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,603

(22) Filed: Nov. 22, 2016

(65) Prior Publication Data

US 2017/0078759 A1 Mar. 16, 2017

Related U.S. Application Data

(63) Continuation of application No. 14/452,660, filed on Aug. 6, 2014, now Pat. No. 9,538,225.

(51) Int. Cl.
*H04N 21/488* (2011.01)
*H04N 21/81* (2011.01)
(Continued)

(52) U.S. Cl.
CPC ..... *H04N 21/4884* (2013.01); *G06Q 30/0264* (2013.01); *H04N 21/237* (2013.01);
(Continued)

(58) Field of Classification Search
CPC .......... H04N 21/4884; H04N 21/8133; H04N 21/47815; H04N 21/812; H04N 21/4788;
(Continued)

(56) References Cited

U.S. PATENT DOCUMENTS

| | | |
|---|---|---|
| 7,103,908 B2 | 9/2006 | Tomsen |
| 7,387,250 B2 | 6/2008 | Muni |

(Continued)

FOREIGN PATENT DOCUMENTS

| | | |
|---|---|---|
| KR | 20030035051 | 5/2003 |
| WO | 2010044495 A1 | 4/2010 |

OTHER PUBLICATIONS

"IMS Integrated IPTV with Multi-screen Foundation", Technology White Paper, 2010, 18 pages.

(Continued)

*Primary Examiner* — Pinkal R Chokshi
(74) *Attorney, Agent, or Firm* — Guntin & Gust, PLC; Ralph Trementozzi

(57) ABSTRACT

Aspects of the subject disclosure may include, for example, a method that includes providing, by a server, media content to a set top box; the media content includes an advertisement and a closed captioning line and the set top box is associated with a display device. The method also includes facilitating access to a shopping application for download at a communication device separate from the set top box, and inserting into the closed captioning line an identifier of a commerce event. The method further includes transmitting to the set top box a message for presentation on the closed captioning line on the display device, receiving a request to provide information regarding an advertised product to the communication device, and transmitting to the communication device the information regarding the advertised product. Other embodiments are disclosed.

20 Claims, 12 Drawing Sheets

(51) Int. Cl.

| | |
|---|---|
| *H04N 21/478* | (2011.01) |
| *H04N 21/258* | (2011.01) |
| *H04N 21/237* | (2011.01) |
| *H04N 21/2668* | (2011.01) |
| *H04N 21/4788* | (2011.01) |
| *H04N 21/254* | (2011.01) |
| *G06Q 30/02* | (2012.01) |
| *H04N 21/41* | (2011.01) |

(52) U.S. Cl.
CPC ... *H04N 21/2542* (2013.01); *H04N 21/25891* (2013.01); *H04N 21/2668* (2013.01); *H04N 21/4122* (2013.01); *H04N 21/4126* (2013.01); *H04N 21/4788* (2013.01); *H04N 21/47815* (2013.01); *H04N 21/488* (2013.01); *H04N 21/812* (2013.01); *H04N 21/8133* (2013.01)

(58) Field of Classification Search
CPC ........... H04N 21/4122; H04N 21/4126; H04N 21/25891; H04N 21/237; H04N 21/2668
See application file for complete search history.

(56) References Cited

U.S. PATENT DOCUMENTS

| | | | |
|---|---|---|---|
| 7,814,521 B2 | 10/2010 | Ou et al. | |
| 8,010,978 B2 | 8/2011 | Park et al. | |
| 8,196,164 B1* | 6/2012 | Oztaskent | H04N 21/435 |
| | | | 725/137 |
| 8,213,426 B2 | 7/2012 | Zampiello | |
| 8,327,399 B2 | 12/2012 | Noll et al. | |
| 8,640,162 B2 | 1/2014 | Chen et al. | |
| 10,121,133 B2* | 11/2018 | Nelms | G06Q 20/20 |
| 2002/0082943 A1 | 6/2002 | Ibe | |
| 2006/0143651 A1* | 6/2006 | Kim | H04N 5/445 |
| | | | 725/39 |
| 2007/0185776 A1 | 8/2007 | Nguyen et al. | |
| 2008/0098450 A1 | 4/2008 | Wu | |
| 2010/0004984 A1 | 1/2010 | Beyabani et al. | |
| 2010/0131385 A1 | 5/2010 | Harrang | |
| 2011/0164175 A1* | 7/2011 | Chung | H04N 21/4126 |
| | | | 348/468 |
| 2012/0084811 A1* | 4/2012 | Thompson | H04N 21/44222 |
| | | | 725/34 |
| 2012/0117586 A1 | 5/2012 | McCoy et al. | |
| 2012/0210378 A1 | 8/2012 | McCoy et al. | |
| 2012/0233646 A1 | 9/2012 | Coniglio et al. | |
| 2012/0233651 A1 | 9/2012 | Lee et al. | |
| 2013/0007801 A1 | 1/2013 | Lehtonen et al. | |
| 2013/0176493 A1 | 7/2013 | Khosla et al. | |
| 2014/0019281 A1* | 1/2014 | O'Dell | G06Q 30/0643 |
| | | | 705/26.1 |
| 2014/0101693 A1 | 4/2014 | Shkedi | |
| 2014/0115644 A1 | 4/2014 | Kim et al. | |
| 2014/0359659 A1 | 12/2014 | Tsuchiuchi | |
| 2015/0073921 A1 | 3/2015 | Vasudevan | |

OTHER PUBLICATIONS

"Sync brings multiscreen interactive advertising together", TV Technology.com, Nov. 7, 2012, 3 pages.
"Targeted Interactive Advertising: A Killer Revenue App", Strategic White Paper, 2009, 13 pages.
Bonastre, Oscar M. et al., "Advances in IPTV Technologies", Signal Processing: Image Communication, vol. 26, Issue 7 (Abstract ), Aug. 7, 2011, 1 page.
Christian, Patrick , "Addressable IPTV Advertising: Dramatically Increasing Advertising Revenue per Viewer", IPTV Magazine.com, 2005, 7 pages.
Kodialam, M. et al., "Online Scheduling of Targeted Advertisements for IPTV", IEEE Xplore Digital Library, vol. 19, Issue 6 (Abstract), Dec. 2011, 2 pages.
Lim, Tae-Beom et al., "Real-time adaptive advertising1 framework based on MPEG-21 for multi-screen IPTV environment", IEEE Xplore Digital Library, (Abstract), Jan. 2012, 2 pages.
Obele, B.O. et al., "On building a successful IPTV business model based on personalized IPTV content & services", IEEE Xplore Digital Library, (Abstract), Sep. 2009, 2 pages.
Peng, Tan et al., "Multi-screen IPTV: Enabling technologies and challenges", IEEE Xplore Digital Library, (Abstract), Jan. 2011, 2 pages.
Wilson, P.R. et al., "Monetizing IMS-based IPTV through personalized advertising", IEEE Xplore Digital Library, (Abstract), Oct. 2009, 2 pages.

* cited by examiner

100

200

300

400

500

600

700

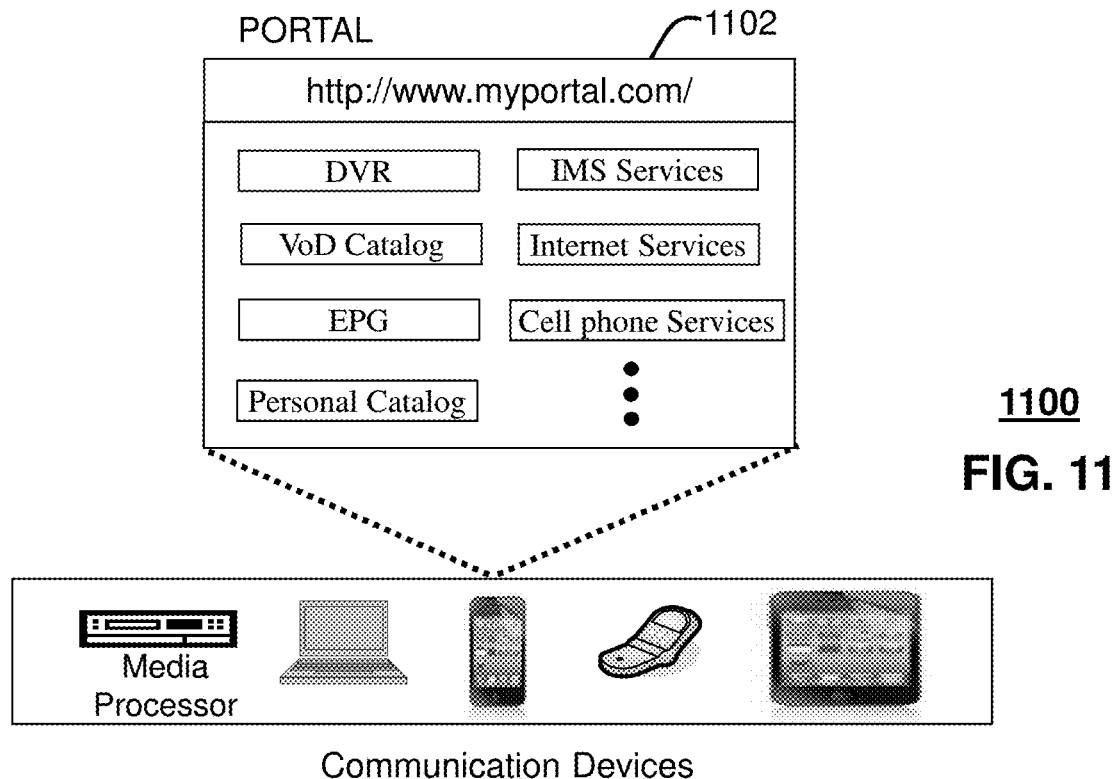

US 10,506,296 B2

SYSTEM AND METHOD FOR PROCESSING COMMERCE EVENTS

CROSS-REFERENCE TO RELATED APPLICATIONS

This application is a continuation of and claims priority to U.S. patent application Ser. No. 14/452,660, filed Aug. 6, 2014, which is hereby incorporated by reference into this application as if set forth herein in full.

FIELD OF THE DISCLOSURE

The subject disclosure relates to a system and method for processing commerce events.

BACKGROUND

Owners of media presentation devices, such as televisions connected to set top boxes, often also own mobile devices such as tablets and smart phones. A network subscriber therefore can receive content via a mobile device while viewing different content on a television.

BRIEF DESCRIPTION OF THE DRAWINGS

Reference will now be made to the accompanying drawings, which are not necessarily drawn to scale, and wherein:

FIG. 11 depicts an illustrative embodiment of a web portal for interacting with the communication systems of [try to link to FIGS. 1-2, and 9-10];

FIG. 12 depicts an illustrative embodiment of a communication device; and

DETAILED DESCRIPTION

Figure 1:
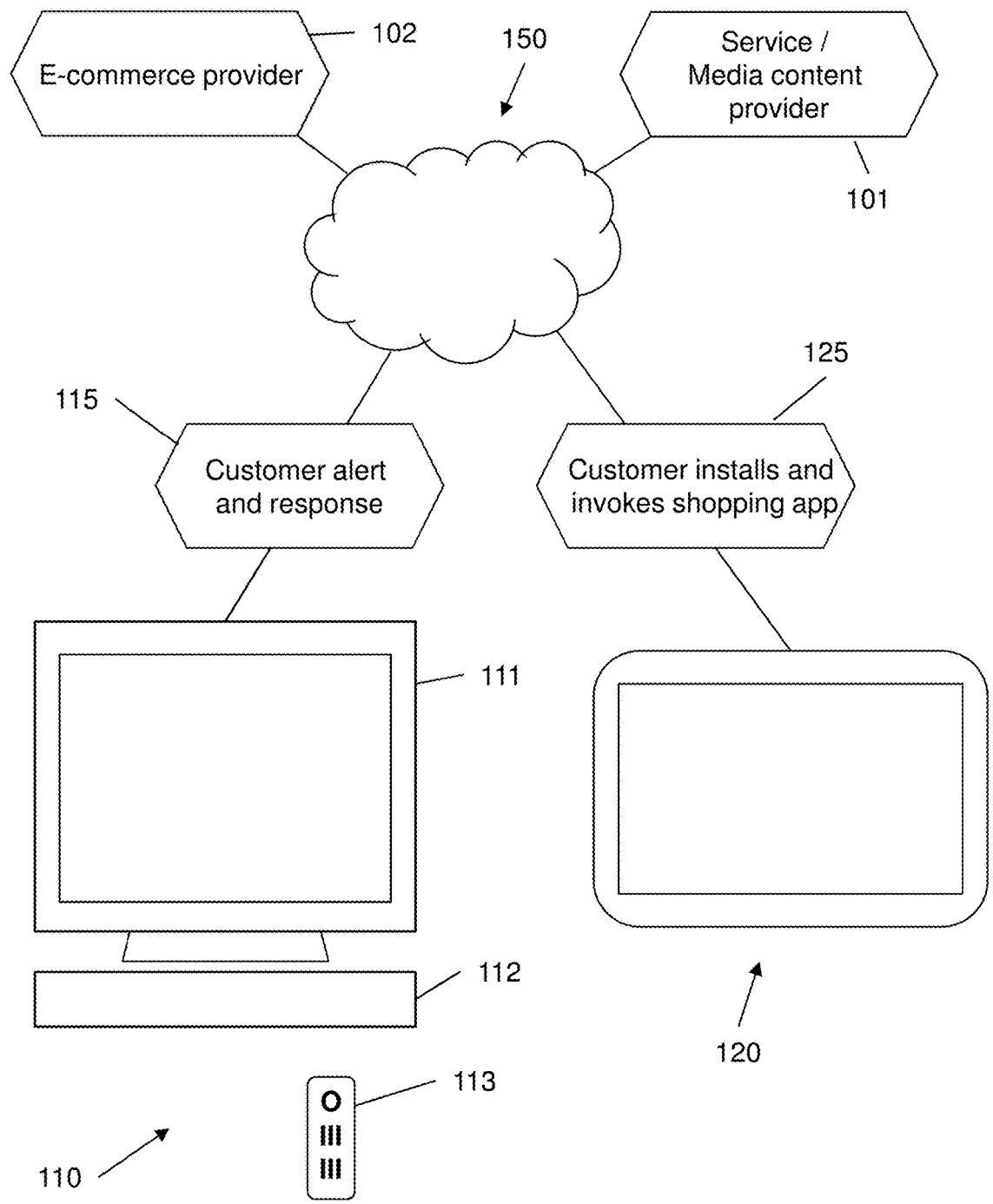
FIG. 1 schematically illustrates a system for providing media content and engaging a customer in an e-commerce event, according to an embodiment of the disclosure.

The subject disclosure describes, among other things, illustrative embodiments for processing e-commerce events across multiple user devices (multi-screen events), in which a user can be alerted to an e-commerce event via one screen, and engage in the e-commerce event using a device with a second screen. Other embodiments are described in the subject disclosure.

One or more aspects of the subject disclosure include a first display device (e.g. a television coupled to a set top box) and a second display device (e.g. a tablet or smart phone) which provide two separate screens for receiving video content and conducting e-commerce transactions. In particular, a user can view an advertisement on the first screen of the first device, obtain further information via the second screen of the second device, and then engage in an e-commerce transaction using the second device without interrupting content viewing on the first device.

One embodiment of the subject disclosure includes a server comprising a memory to store instructions and a controller coupled to the memory. The controller, responsive to executing the instructions, performs operations. The operations comprise providing media content to a media processor; the media content comprises an advertisement and a closed captioning line, and the media processor is associated with a first display. The operations also comprise facilitating access to a first shopping application for download at a communication device separate from the media processor and having a second display, and inserting into the closed captioning line an identifier of a commerce event related to the advertisement. The operations further comprise transmitting to the media processor a text message for presentation on the closed captioning line simultaneous with presentation of the advertisement on the first display; the text message comprises a prompt for user input. The operations also comprise receiving, from the media processor in accordance with the input, a request to provide information regarding an advertised product to the communication device, and transmitting to the communication device the information regarding the advertised product to enable the communication device to execute the first application to search for a second application in accordance with the identifier. The second application executes on the communication device to engage a user in accordance with the commerce event.

One embodiment of the subject disclosure includes a computer-readable storage device comprising instructions which, when executed by a processor, cause the processor to perform operations. The operations comprise transmitting to a media processor media content that comprises an advertisement and a closed captioning line, providing access to a shopping application for installation on a mobile communication device separate from the media processor, and inserting into the closed captioning line a unique value identifying a commerce event. The operations also comprise transmitting to the media processor a message for presentation on the closed captioning line on a display associated with the media processor, and receiving a request to provide information regarding an advertised product to the mobile communication device. The operations further comprise transmitting the information regarding the advertised product to enable the mobile communication device to execute the shopping application to search for a commerce application for performing an e-commerce transaction.

One embodiment of the subject disclosure includes a method comprising providing, by a server, media content to a set top box, where the media content comprises an advertisement and a closed captioning line and the set top box is associated with a display device. The method also comprises facilitating access to a shopping application for download at a communication device separate from the set top box, and inserting into the closed captioning line an identifier of a commerce event. The method further comprises transmitting to the set top box a message for presentation on the closed captioning line on the display device, receiving a request to provide information regarding an advertised product to the communication device, and transmitting to the communication device the information regarding the advertised product.

FIG. 1 depicts an illustrative embodiment 100 of the disclosure in which a media content provider 101 can provide content over a network 150 to a network subscriber. In this embodiment, two sets of equipment are associated with the subscriber: a home based media center 110 including display device 111, media processor 112 and remote control 113, and a mobile communication device (for example, a tablet 120). The subscriber can receive e-commerce messages (for example, product offers and product recommendations) from an e-commerce provider 102. In this embodiment, customer alerts 115 regarding e-commerce events are displayed on display device 111; the subscriber can send a response to a customer alert via media processor 112 using remote control device 113. Additional e-commerce messages are transmitted from e-commerce provider 102 over network 150 for display on mobile device 120. The subscriber can engage with an e-commerce event (e.g., by making a purchase in response to a discount offer displayed on device 120) by launching a shopping application (shopping app) 125 on device 120. In this embodiment, the subscriber can engage in a multi-screen process—that is, continue to view the media presentation at media center 110 while executing an e-commerce transaction using tablet 120.

Figure 2:
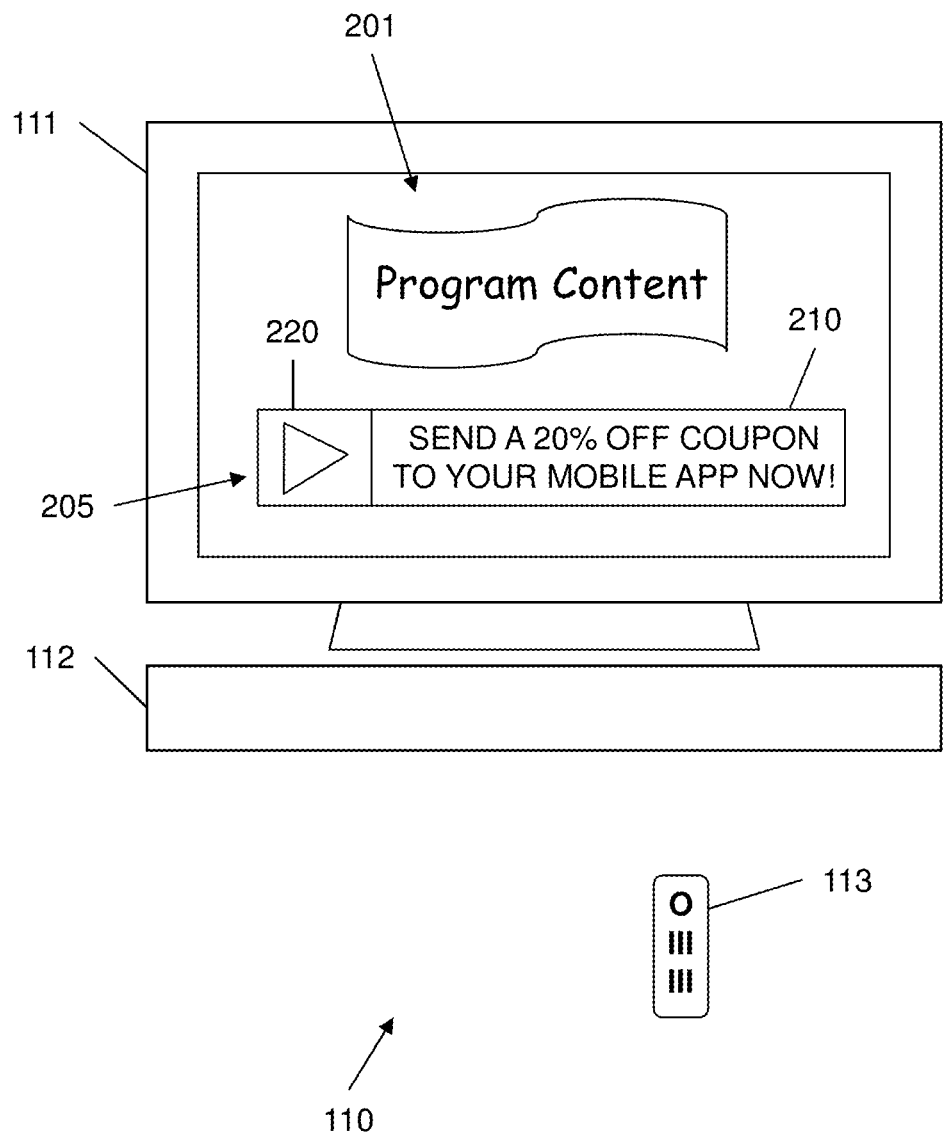
FIG. 2 depicts an illustrative embodiment of the disclosure in which a customer alert is displayed on equipment of a subscriber.

FIG. 2 depicts an illustrative embodiment 200 in which a media program and a customer alert are received at subscriber media processor 112 and displayed on display device 111. In this embodiment, a value is inserted into a closed captioning line associated with the program content 201. The inserted value identifies an e-commerce event. A text message is associated with this value and provides a customer alert overlaid on the program content. As shown in FIG. 2, overlay 205 on the displayed program content includes a text message 210 and an action button 220. Text message 210 invites the subscriber to engage in the e-commerce event; the text may accordingly be termed a "call to action." In this embodiment, shopping app 125 has been downloaded and installed on a mobile device (e.g. tablet 120), and the shopping app is referred to as a "mobile app" in text message 210. The subscriber can respond to the call to action by selecting the button 220, using the remote control 113.

In an embodiment, an application is deployed via network 150 to the media processor 112, enabling the media processor to review the program content and associated closed captioning and detect the inserted value identifying the e-commerce event. When the inserted value is detected, the media processor can then cause the call to action 210 to be displayed over the program content 201.

In another embodiment, the displayed content can itself be an advertisement. In this embodiment, displaying the advertisement on device 111 automatically triggers display of the call to action 210 and action button 220.

Figure 3:
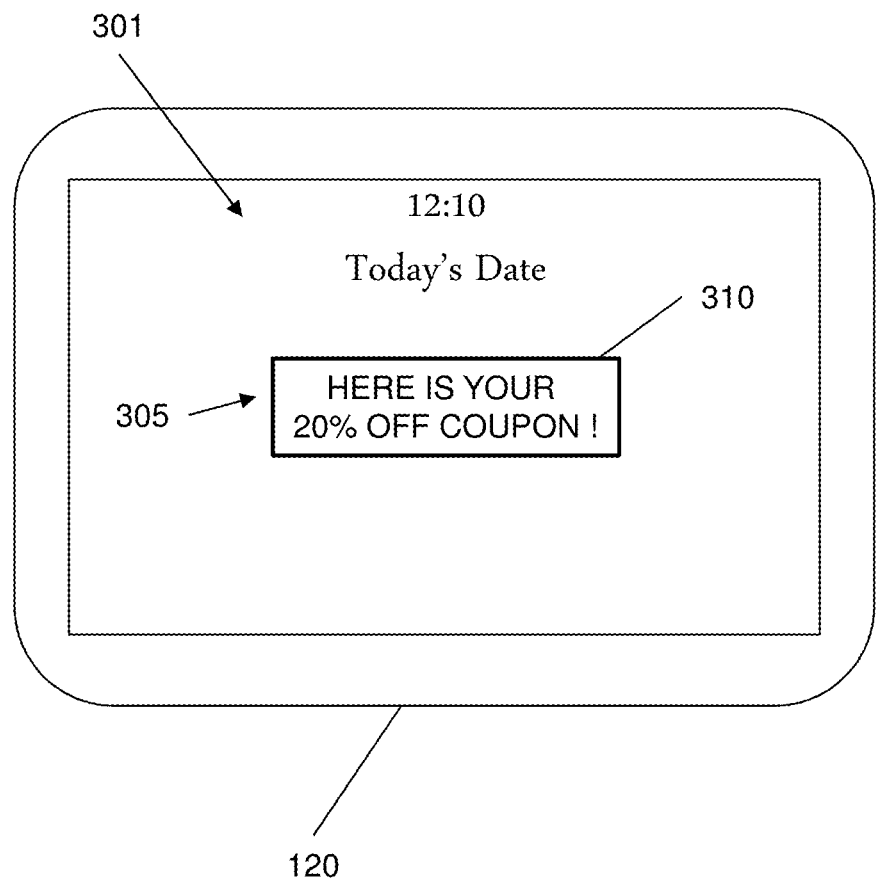
FIG. 3 depicts an illustrative embodiment of the disclosure in which an invitation to engage in an e-commerce event is displayed on an additional screen associated with the subscriber.

FIG. 3 illustrates an embodiment 300 with a display on tablet 120 resulting from the subscriber selecting action button 220, in accordance with the embodiment shown in FIG. 2. Display 301 has an overlay 305 with a text message 310, notifying the subscriber that the subscriber can continue with the e-commerce event by using the tablet. The shopping app is launched on the tablet 120 without interrupting presentation of the program on display 111.

Figure 4:
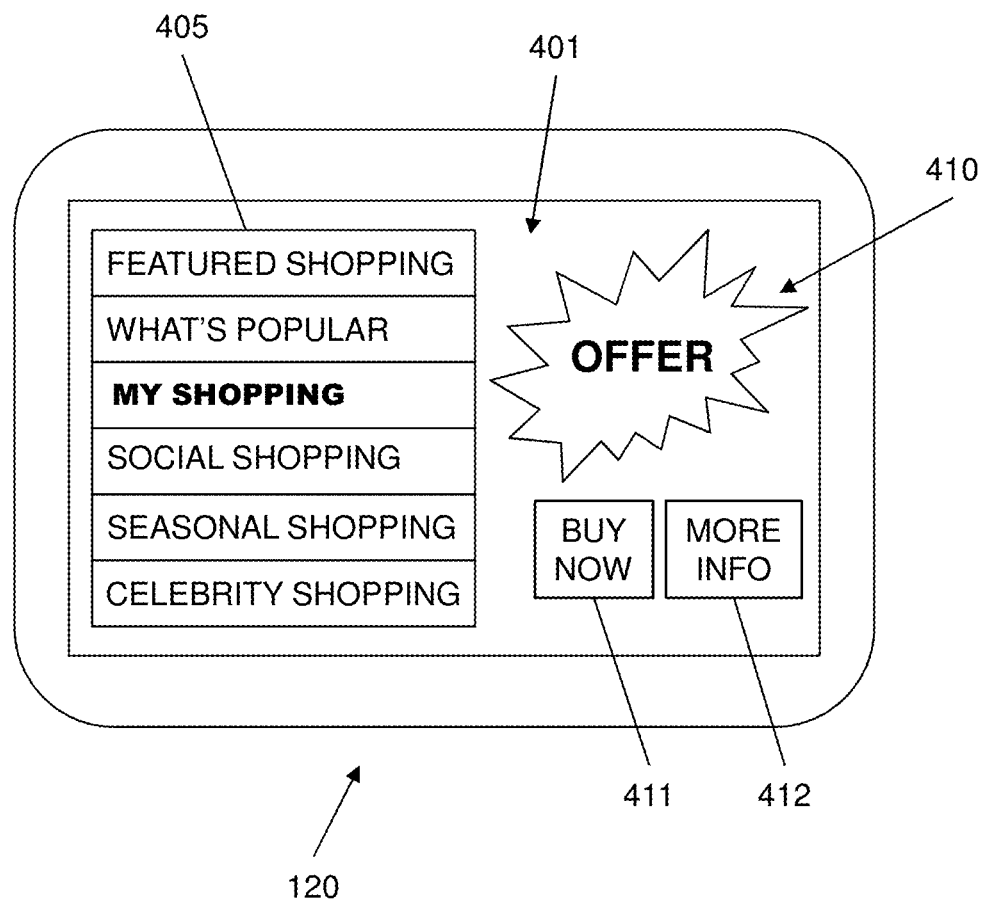
FIGS. 4-5 schematically illustrate engagement by the subscriber in a multi-screen e-commerce event.

FIG. 4 illustrates an embodiment 400 with a display on tablet 120 that facilitates subscriber engagement with the shopping app and the e-commerce event, in accordance with the embodiments shown in FIGS. 2 and 3. In this embodiment, the shopping app causes display 401 to be presented, including a menu 405 of shopping options, an offer 410 regarding a good or service, and action buttons 411, 412 enabling the subscriber to initiate a purchase or obtain further information. In this embodiment, the "My Shopping" option is displayed on tablet 120 when the shopping app is launched. Selecting the "My Shopping" option causes the tablet 120 to display goods and services that correspond to the subscriber's preferences in the shopper profile or correspond to previous online or in-store purchases. The other options can include: "Featured Shopping" for display of advertisements from selected advertisers; "What's Popular" for display of advertisements of goods and services trending in popularity; "Social Shopping" for viewing and posting shared shopping lists; "Seasonal Shopping" for display of advertisements from seasonal advertising campaigns of selected advertisers; and "Celebrity Shopping" for displaying shopping profiles of entertainment personalities and characters.

Figure 5:
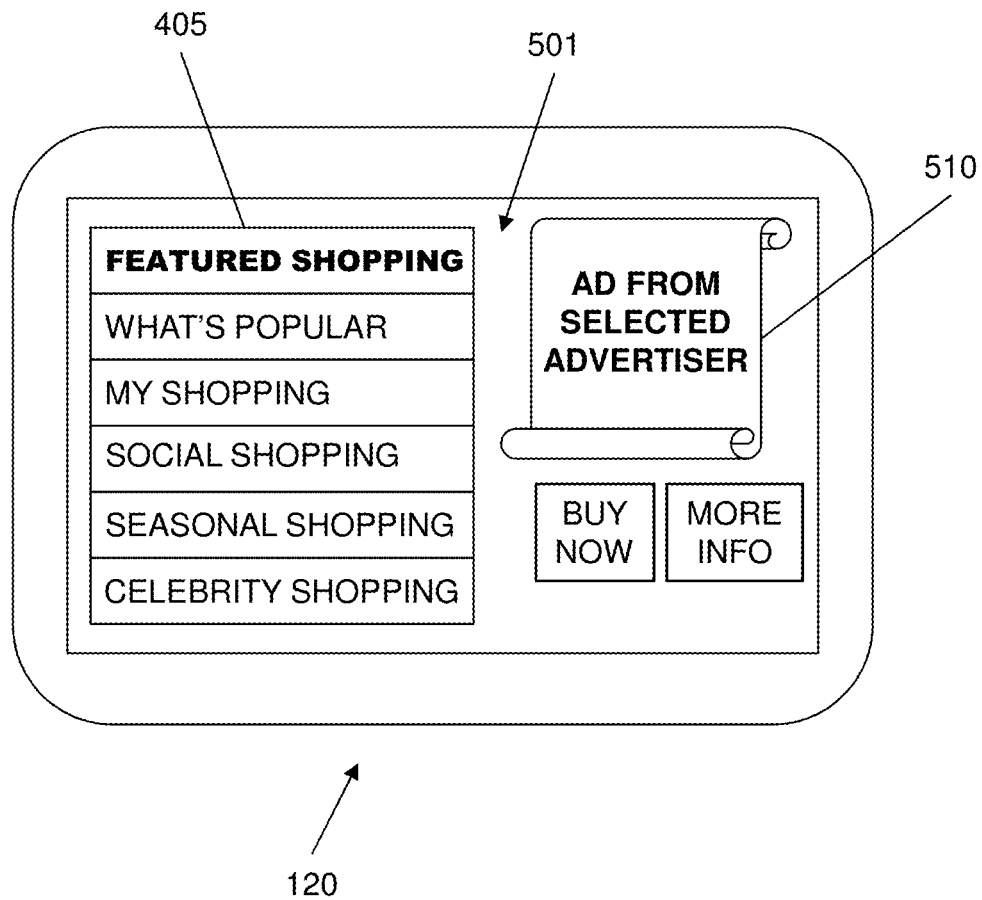

FIG. 5 illustrates an embodiment 500 with a display on tablet 120, where the "Featured Shopping" option is selected, in accordance with the embodiments shown in FIGS. 2-4. In this embodiment, display 501 includes an advertisement 510 from a selected advertiser. The advertiser can be selected by the service provider 101 according to predefined criteria (in this embodiment, those criteria may or may not correspond to the shopper preferences). In another embodiment, the advertisement can be targeted to the subscriber based on preferences in the shopper profile.

Figure 6:
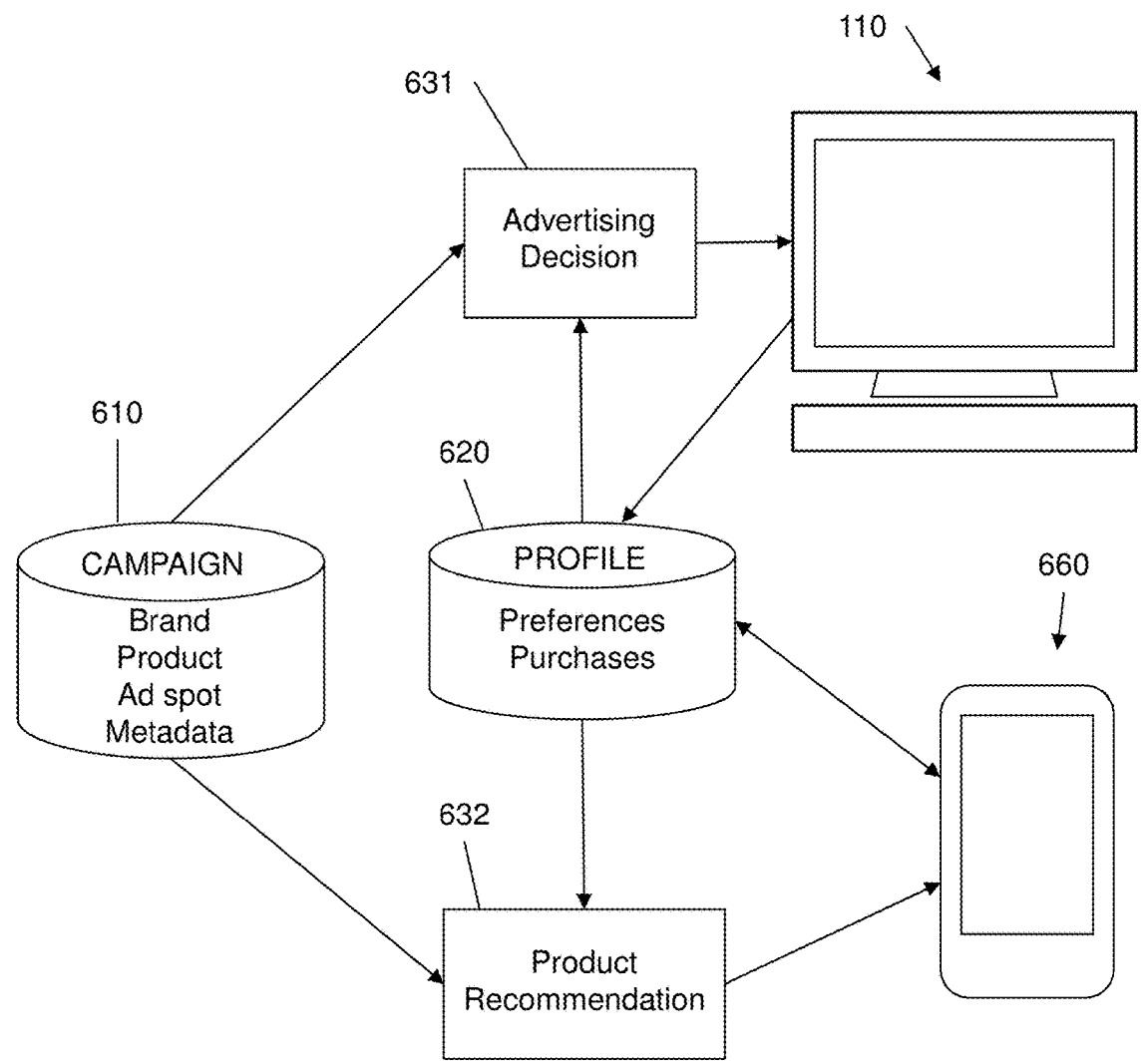
FIG. 6 schematically illustrates a system, in accordance with an embodiment of the disclosure, in which targeted advertisements and product recommendations are delivered to a subscriber.

FIG. 6 schematically illustrates databases used in delivering targeted advertising to a subscriber engaging in a multi-screen e-commerce event, in accordance with an embodiment 600 of the disclosure. An advertiser establishes a database 610 with information relevant to an ad campaign. For example, database 610 may include descriptions of the brand being advertised, detailed product information, and video files with the advertisements (ad spots) that are to be used in the campaign. In an embodiment, a file having an ad spot also includes metadata regarding a call to action that is to be displayed as an overlay on the advertisement. In a further embodiment, the metadata includes a value to be inserted in a closed captioning line of the advertisement, and the database further includes a list of text messages, each of which is correlated to a unique value.

As shown in FIG. 6, database 620 may include shopper profiles for the network subscribers. Each profile can include details regarding a subscriber's preferences and previous product purchases. In an embodiment, a subscriber completes a shopper profile when downloading and installing the mobile shopping app. An advertiser can access the shopper profile 620, select campaign ads from database 610 that correlate to the subscriber's preferences, and then make a decision 631 to target the subscriber's equipment 110 with the selected advertisement. If the subscriber responds to the call to action displayed with the targeted advertisement, the subscriber can engage in an e-commerce event (e.g. a product purchase) using a mobile device (e.g. a mobile phone 660).

In a further embodiment, information regarding the subscriber's preferences and purchases can be correlated with the product information in the ad campaign database to produce recommendations 632 for products to be displayed in targeted advertisements. (For example, the targeted ad can have a message such as "You recently purchased product X. You may also like our product Y, which we are offering for a limited time at a 20% discount.") In an embodiment, the product recommendation can be integrated into the call to action, so that the text message in the call to action is targeted as well as the advertisement itself.

Figure 7:
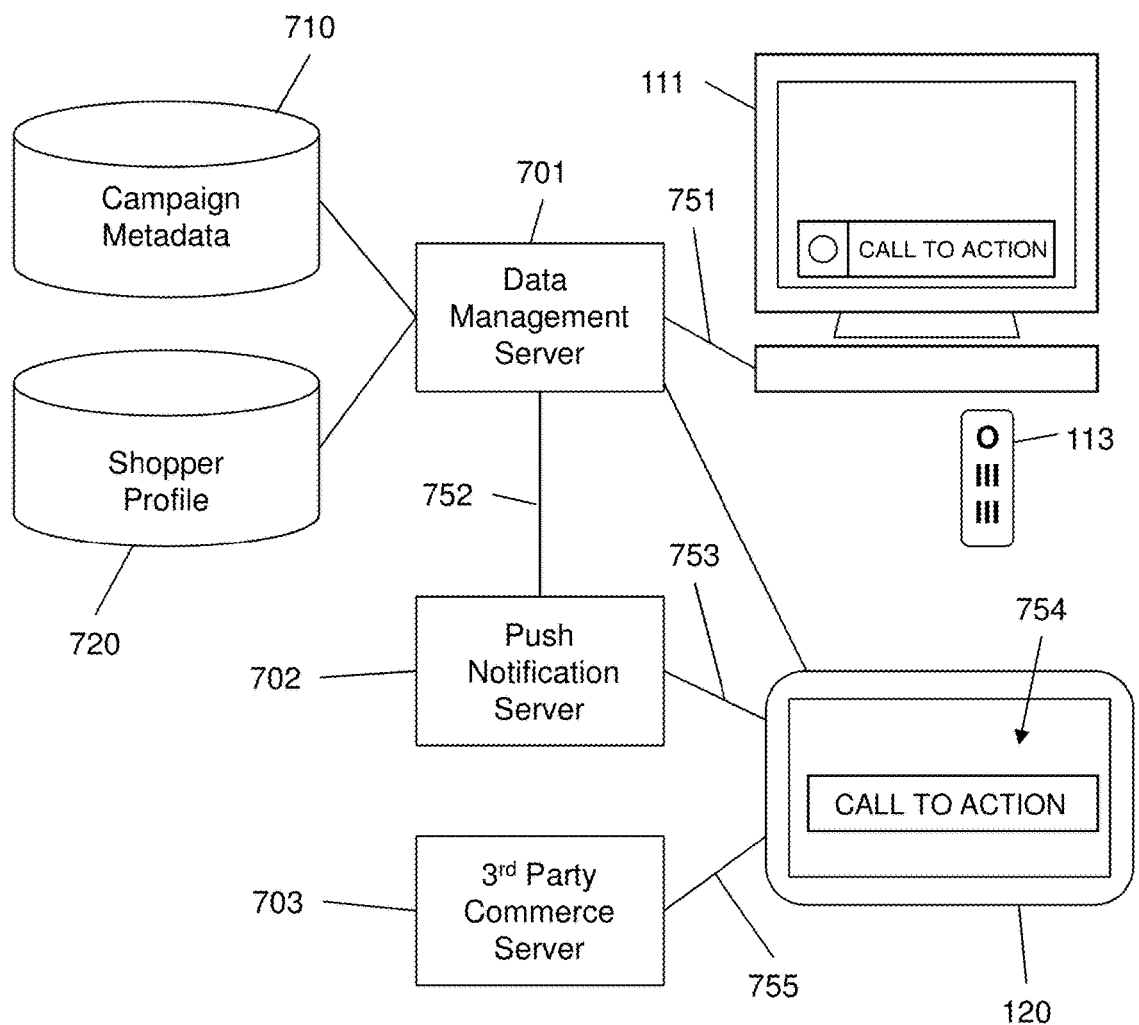
FIG. 7 schematically illustrates a system, in accordance with an embodiment of the disclosure, in which a subscriber request to engage in a multi-screen e-commerce event is processed.

FIG. 7 schematically illustrates databases and devices for engaging a subscriber in a multi-screen e-commerce event, according to an embodiment 700 of the disclosure. In this embodiment, a triggered push notification (PN) procedure is used. Data management server 701 can access advertising campaign database 710 and shopper profile database 720, and is communicatively coupled to PN server 702.

A response to a call to action (e.g. a subscriber selecting an action button using remote control 113) is received at media processor 112, which then sends a push notification request 751 to data management server 701. PN request 751 includes the commerce event identifier (e.g. the value inserted in the closed captioning line of the displayed video content). Data management server 701 formats the PN request and sends the formatted PN request 752 to PN server 702. PN server 702 then sends a PN message 753 to mobile device 120. The shopping app on device 120 responds to the push notification by completing a table lookup for a commerce application that corresponds to the commerce event identifier. A message 754 is displayed on mobile device 120 alerting the subscriber that an e-commerce transaction can be concluded on the mobile device. (In an embodiment, this display is a replica of the call to action message displayed on device 111.) The commerce application on the mobile device then sends a request 755 to a third-party commerce server 703 to proceed with the e-commerce transaction (e.g. purchase of an advertised product).

Figure 8:
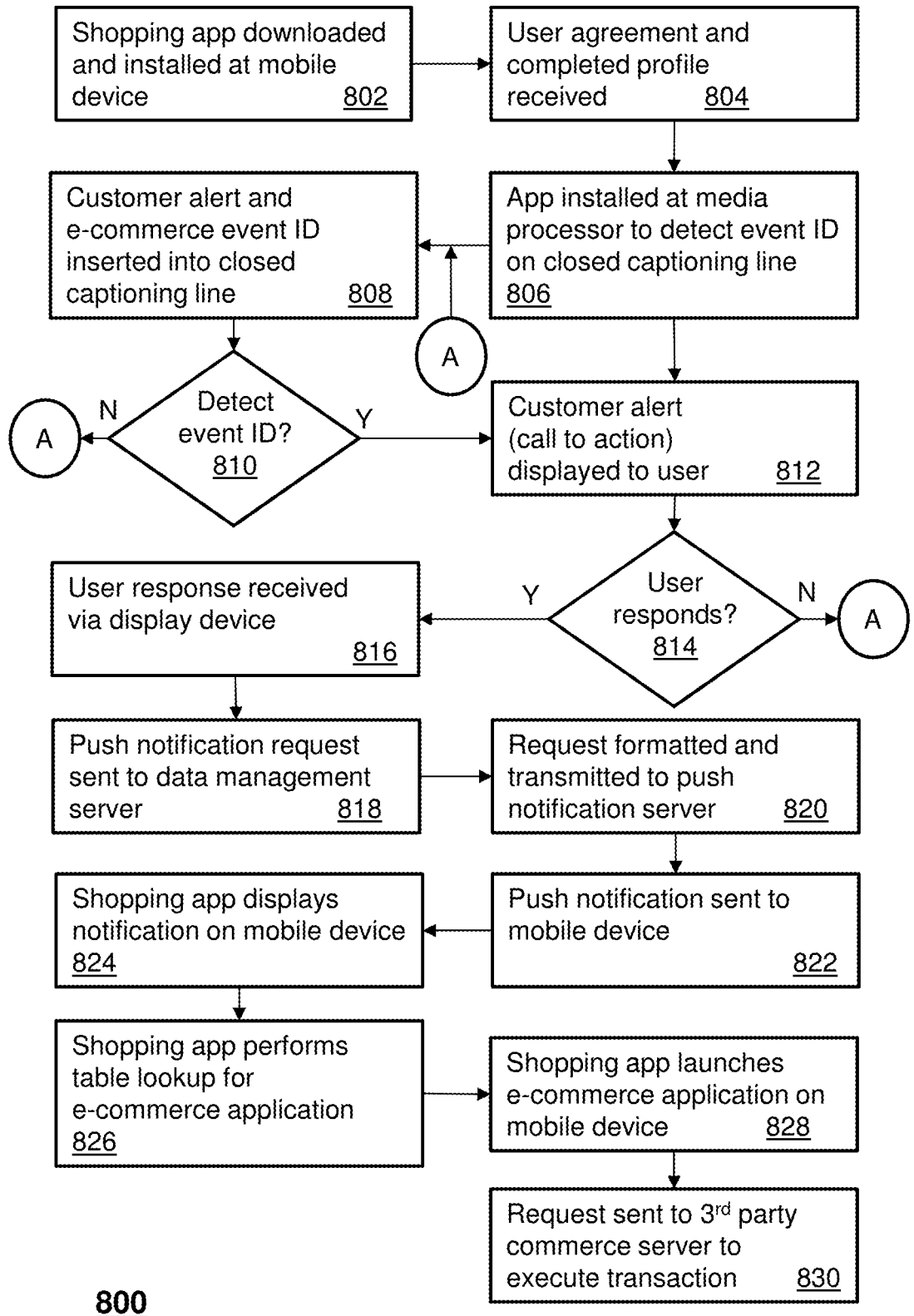
FIG. 8 depicts an illustrative embodiment of a method used in portions of the system described in FIGS. 1-7.

FIG. 8 depicts an illustrative embodiment of a method 800 for engaging a subscriber in a multi-screen e-commerce event associated with an advertising campaign. In step 802, a shopping app is downloaded and installed on a network connected device (e.g. tablet 120). The subscriber completes and transmits an agreement to accept e-commerce notifications and a shopper profile (step 804). In step 806, an application is installed at the subscriber equipment (e.g. media processor 112) to detect an identifier of an advertising campaign event on a closed captioning line of video content presented via the media processor. A unique value identifying an e-commerce event is inserted into a closed captioning line of video content, along with a text message that serves as a call to action for the subscriber (step 808). If an event identifier is detected (step 810), the call to action is displayed to the subscriber as the video content is shown (step 812). If the subscriber wishes to respond to the call to action (step 814), the response is sent (step 816) via the display device and the media processor (e.g. by selecting an action button displayed on device 111 using a remote control 113, as described above).

The media processor application (installed in step 806) then sends a push notification request to the data management server (step 818), which formats the PN request and transmits it to the PN server (step 820). The PN server sends the PN to the mobile shopping app at the mobile device (step 822). The mobile shopping app responds to the push notification by displaying a message on the mobile device (step 824) and completing a table lookup (step 826) for the commerce application corresponding to the event identifier. The shopping app then launches the commerce application on the mobile device (step 828), enabling the subscriber to engage in a transaction with a third-party e-commerce server (step 830).

Figure 9:
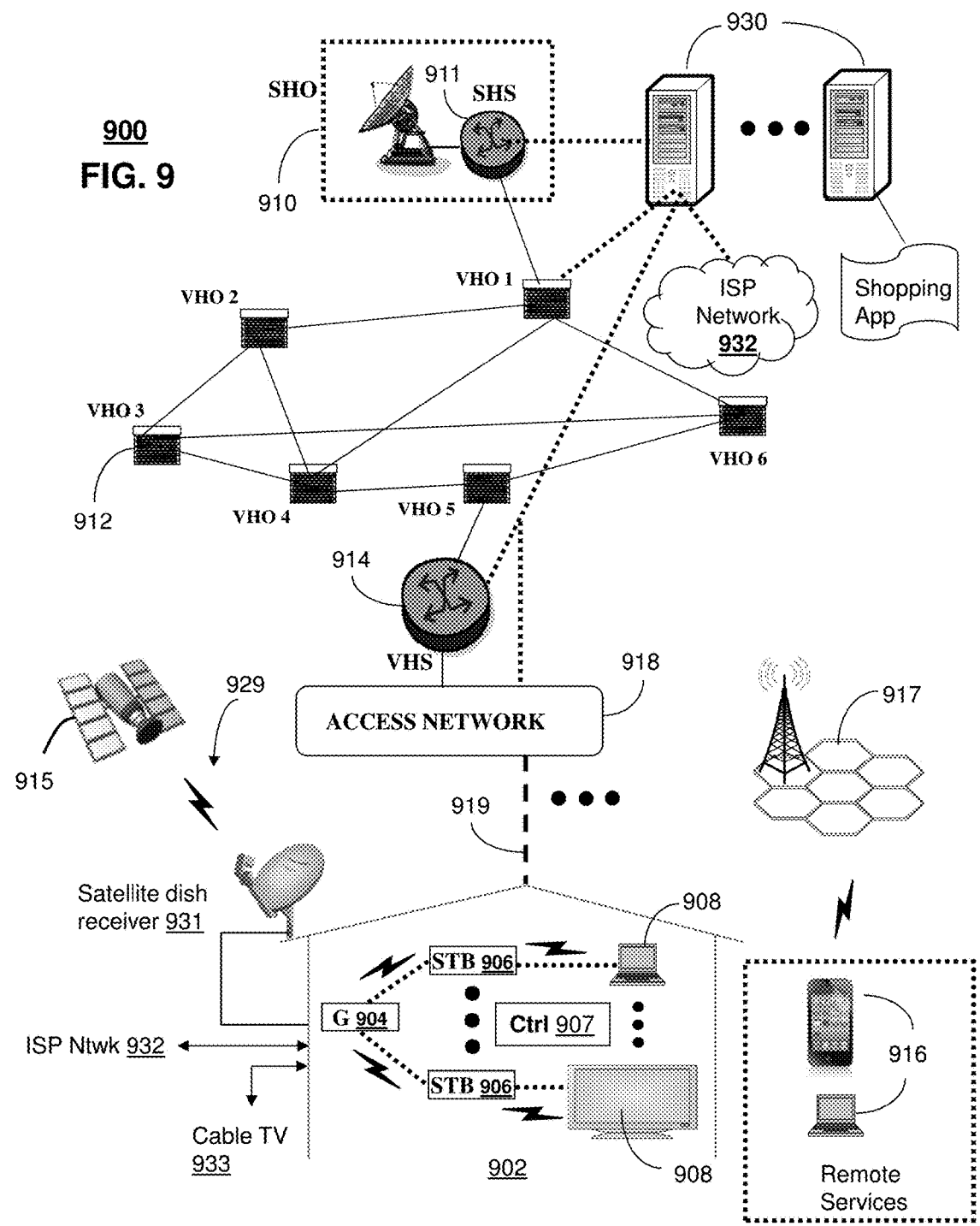
FIGS. 9-10 depict illustrative embodiments of communication systems that provide media services [try to link to FIGS. 1-3]

FIG. 9 depicts an illustrative embodiment of a first communication system 900 for delivering media content. The communication system 900 can represent an Internet Protocol Television (IPTV) media system. Communication system 900 can be overlaid or operably coupled with the system shown in FIG. 1, 6 or 7 as another representative embodiment of communication system 900. For instance, one or more devices illustrated in the communication system 900 of FIG. 9 can function as a server comprising a memory to store instructions and a controller coupled to the memory, where the controller, responsive to executing the instructions, performs operations. The operations can comprise providing media content to a media processor; the media content comprises an advertisement and a closed captioning line, and the media processor is associated with a first display. The operations can also comprise facilitating access to a first shopping application for download at a communication device separate from the media processor and having a second display, and inserting into the closed captioning line an identifier of a commerce event related to the advertisement. The operations can further comprise transmitting to the media processor a text message for presentation on the closed captioning line simultaneous with presentation of the advertisement on the first display; the text message comprises a prompt for user input. The operations can also comprise receiving, from the media processor in accordance with the input, a request to provide information regarding an advertised product to the communication device, and transmitting to the communication device the information regarding the advertised product to enable the communication device to execute the first application to search for a second application in accordance with the identifier. The second application can execute on the communication device to engage a user in accordance with the commerce event.

The IPTV media system can include a super head-end office (SHO) 910 with at least one super headend office server (SHS) 911 which receives media content from satellite and/or terrestrial communication systems. In the present context, media content can represent, for example, audio content, moving image content such as 2D or 3D videos, video games, virtual reality content, still image content, and combinations thereof. The SHS server 911 can forward packets associated with the media content to one or more video head-end servers (VHS) 914 via a network of video head-end offices (VHO) 912 according to a multicast communication protocol.

The VHS 914 can distribute multimedia broadcast content via an access network 918 to commercial and/or residential buildings 902 housing a gateway 904 (such as a residential or commercial gateway). The access network 918 can represent a group of digital subscriber line access multiplexers (DSLAMs) located in a central office or a service area interface that provide broadband services over fiber optical links or copper twisted pairs 919 to buildings 902. The gateway 904 can use communication technology to distribute broadcast signals to media processors 906 such as Set-Top Boxes (STBs) which in turn present broadcast channels to media devices 908 such as computers or television sets managed in some instances by a media controller 907 (such as an infrared or RF remote controller).

The gateway 904, the media processors 906, and media devices 908 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 906 and subsystems of the IPTV media system for services such as video-on-demand (VoD), browsing an electronic programming guide (EPG), or other infrastructure services.

A satellite broadcast television system 929 can be used in the media system of FIG. 9. The satellite broadcast television system can be overlaid, operably coupled with, or replace the IPTV system as another representative embodiment of communication system 900. In this embodiment, signals transmitted by a satellite 915 that include media content can be received by a satellite dish receiver 931 coupled to the building 902. Modulated signals received by the satellite dish receiver 931 can be transferred to the media processors 906 for demodulating, decoding, encoding, and/or distributing broadcast channels to the media devices 908. The media processors 906 can be equipped with a broadband port to an Internet Service Provider (ISP) network 932 to enable interactive services such as VoD and EPG as described above.

In yet another embodiment, an analog or digital cable broadcast distribution system such as cable TV system 933 can be overlaid, operably coupled with, or replace the IPTV system and/or the satellite TV system as another representative embodiment of communication system 900. In this embodiment, the cable TV system 933 can also provide Internet, telephony, and interactive media services.

The subject disclosure can apply to other present or next generation over-the-air and/or landline media content services system.

Some of the network elements of the IPTV media system can be coupled to one or more computing devices 930, a portion of which can operate as a web server for providing web portal services over the ISP network 932 to wireline media devices 908 or wireless communication devices 916.

Communication system 900 can also provide for all or a portion of the computing devices 930 to function as a media content server (herein referred to as server 930). The server 930 can use computing and communication technology to provide program content, advertising, the shopping application and the commerce application and to manage the push notification procedure described above with reference to FIG. 7. For instance, the functions of server 930 can be similar to the functions described above for servers 701 and 702. The media processors 906 and wireless communication devices 916 can be provisioned with software functions to utilize the services of server 930. For instance, the functions of media processors 906 and communication devices 916 can be similar to the functions described above for devices 112, 120 and 660, as shown in FIGS. 1-7.

Multiple forms of media services can be offered to media devices over landline technologies such as those described above. Additionally, media services can be offered to media devices by way of a wireless access base station 917 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 10:
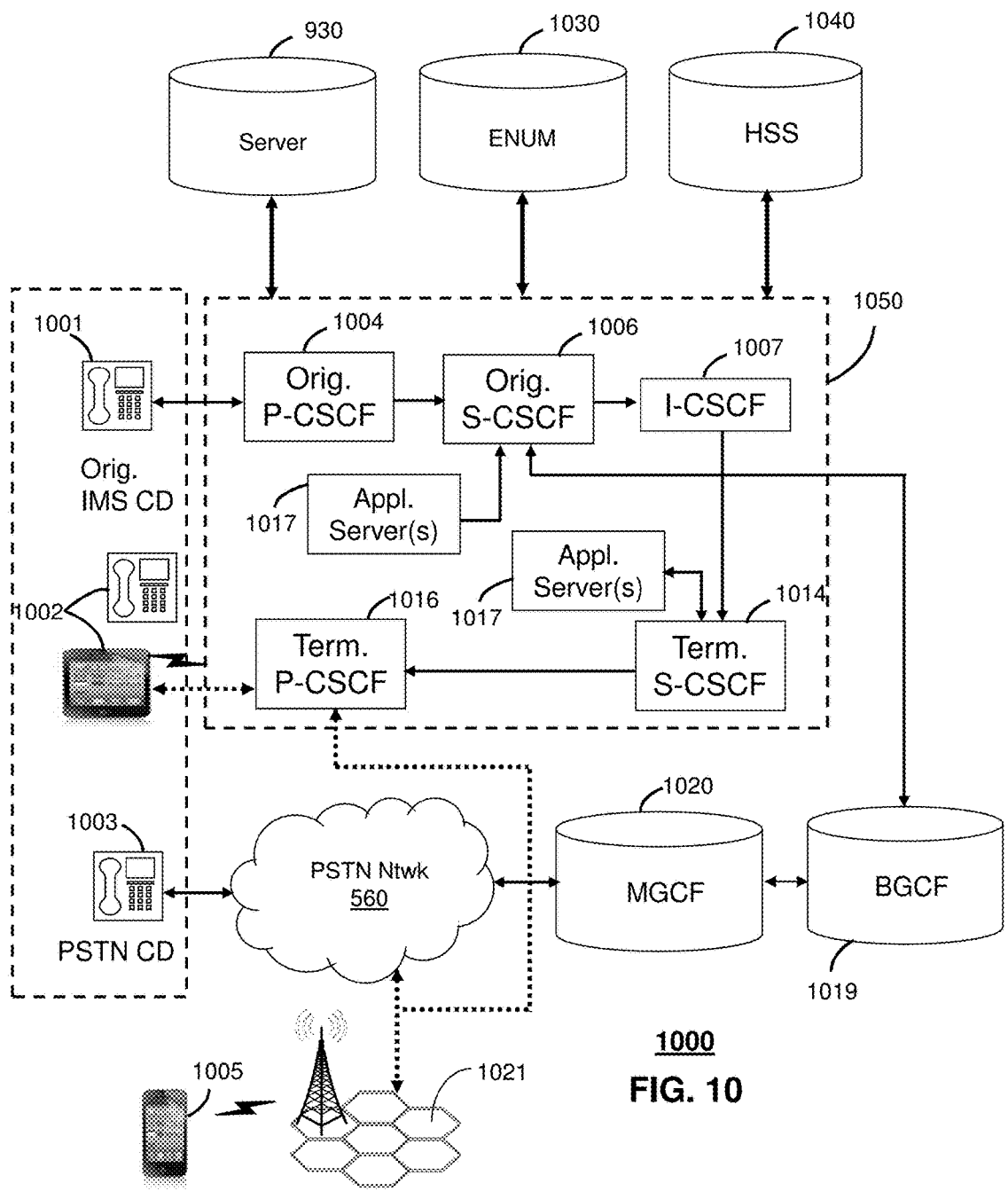

FIG. 10 depicts an illustrative embodiment of a communication system 1000 employing an IP Multimedia Subsystem (IMS) network architecture to facilitate the combined services of circuit-switched and packet-switched systems. Communication system 1000 can be overlaid or operably coupled with the systems of FIG. 1, 6 or 7 and communication system 900 as another representative embodiment of communication system 900. In particular, system 1000 can be configured to perform a method a method comprising providing, by a server, media content to a set top box, where the media content comprises an advertisement and a closed captioning line and the set top box is associated with a display device. The method can also comprise facilitating access to a shopping application for download at a communication device separate from the set top box, and inserting into the closed captioning line an identifier of a commerce event. The method can further comprise transmitting to the set top box a message for presentation on the closed captioning line on the display device, receiving a request to provide information regarding an advertised product to the communication device, and transmitting to the communication device the information regarding the advertised product.

Communication system 1000 can comprise a Home Subscriber Server (HSS) 1040, a tElephone NUmber Mapping (ENUM) server 1030, and other network elements of an IMS network 1050. The IMS network 1050 can establish communications between IMS-compliant communication devices (CDs) 1001, 1002, Public Switched Telephone Network (PSTN) CDs 1003, 1005, and combinations thereof by way of a Media Gateway Control Function (MGCF) 1020 coupled to a PSTN network 1060. The MGCF 1020 need not be used when a communication session involves IMS CD to IMS CD communications. A communication session involving at least one PSTN CD may utilize the MGCF 1020.

IMS CDs 1001, 1002 can register with the IMS network 1050 by contacting a Proxy Call Session Control Function (P-CSCF) which communicates with an interrogating CSCF (I-CSCF), which in turn, communicates with a Serving CSCF (S-CSCF) to register the CDs with the HSS 1040. To initiate a communication session between CDs, an originating IMS CD 1001 can submit a Session Initiation Protocol (SIP INVITE) message to an originating P-CSCF 1004 which communicates with a corresponding originating S-CSCF 1006. The originating S-CSCF 1006 can submit the SIP INVITE message to one or more application servers (ASs) 1017 that can provide a variety of services to IMS subscribers.

For example, the application servers 1017 can be used to perform originating call feature treatment functions on the calling party number received by the originating S-CSCF 1006 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1006 can submit queries to the ENUM system 1030 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1007 to submit a query to the HSS 1040 to identify a terminating S-CSCF 1014 associated with a terminating IMS CD such as reference 1002. Once identified, the I-CSCF 1007 can submit the SIP INVITE message to the terminating S-CSCF 1014. The terminating S-CSCF 1014 can then identify a terminating P-CSCF 1016 associated with the terminating CD 1002. The P-CSCF 1016 may then signal the CD 1002 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 10 may be interchangeable. It is further noted that communication system 1000 can be adapted to support video conferencing. In addition, communication system 1000 can be adapted to provide the IMS CDs 1001, 1002 with the multimedia and Internet services of communication system 900 of FIG. 9.

If the terminating communication device is instead a PSTN CD such as CD 1003 or CD 1005 (in instances where the cellular phone only supports circuit-switched voice communications), the ENUM system 1030 can respond with an unsuccessful address resolution which can cause the originating S-CSCF 1006 to forward the call to the MGCF 1020 via a Breakout Gateway Control Function (BGCF) 1019. The MGCF 1020 can then initiate the call to the terminating PSTN CD over the PSTN network 1060 to enable the calling and called parties to engage in voice and/or data communications.

It is further appreciated that the CDs of FIG. 10 can operate as wireline or wireless devices. For example, the CDs of FIG. 10 can be communicatively coupled to a cellular base station 1021, a femtocell, a WiFi router, a Digital Enhanced Cordless Telecommunications (DECT) base unit, or another suitable wireless access unit to establish communications with the IMS network 1050 of FIG. 10. The cellular access base station 1021 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 10.

Cellular phones supporting LTE can support packet-switched voice and packet-switched data communications and thus may operate as IMS-compliant mobile devices. In this embodiment, the cellular base station 1021 may communicate directly with the IMS network 1050 as shown by the arrow connecting the cellular base station 1021 and the P-CSCF 1016.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 930 of FIG. 9 can be operably coupled to communication system 1000 for purposes similar to those described above. Server 930 can provide shopping and commerce apps to the CDs 1001, 1002, 1003 and 1005 of FIG. 10. CDs 1001, 1002, 1003 and 1005 can be adapted with software to utilize the services of the server 930. Server 930 can be an integral part of the application server(s) 1017, which can be adapted to the operations of the IMS network 1050.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

FIG. 11 depicts an illustrative embodiment of a web portal 1102 of a communication system 1100. Communication system 1100 can be overlaid or operably coupled with communication system 900, and/or communication system 1000 as another representative embodiment of the systems of FIGS. 1, 6 and 7, communication system 900, and/or communication system 1000. The web portal 1102 can be used for managing services of the systems of FIGS. 1, 6 and 7 and communication systems 900-1000. A web page of the web portal 1102 can be accessed by a Uniform Resource Locator (URL) with an Internet browser using an Internet-capable communication device such as those described in FIGS. 1-7 and FIGS. 9-10. The web portal 1102 can be configured, for example, to access a media processor 906 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 906. The web portal 1102 can also be used for provisioning IMS services described earlier, provisioning Internet services, provisioning cellular phone services, and so on.

The web portal 1102 can further be utilized to manage and provision the software applications in steps 802, 806 and 828 of FIG. 8, and to adapt these applications as may be desired by subscribers and/or service providers of the systems of FIGS. 1, 6 and/or 7, and communication systems 900-1000. For instance, users of the services provided by server 930 can log into their on-line accounts and provision the server 930 with user profiles as described above with reference to FIGS. 6-7 and step 804 of FIG. 8, and so on. Service providers can log onto an administrator account to provision, monitor and/or maintain the systems of FIGS. 1, 6 and 7 or server 930.

FIG. 12 depicts an illustrative embodiment of a communication device 1200. Communication device 1200 can serve in whole or in part as an illustrative embodiment of the devices depicted in FIGS. 1-7, and FIGS. 9-10. Communication device 1200 in whole or in part can represent any of the communication devices described in FIGS. 1-7 and 9-101 and can be configured to perform portions of method 800 of FIG. 8.

Communication device 1200 can comprise a wireline and/or wireless transceiver 1202 (herein transceiver 1202), a user interface (UI) 1204, a power supply 1214, a location receiver 1216, a motion sensor 1218, an orientation sensor 1220, and a controller 1206 for managing operations thereof. The transceiver 1202 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1202 can also be adapted to support circuit-switched wireline access technologies (such as PSTN), packet-switched wireline access technologies (such as TCP/IP, VoIP, etc.), and combinations thereof.

The UI 1204 can include a depressible or touch-sensitive keypad 1208 with a navigation mechanism such as a roller ball, a joystick, a mouse, or a navigation disk for manipulating operations of the communication device 1200. The keypad 1208 can be an integral part of a housing assembly of the communication device 1200 or an independent device operably coupled thereto by a tethered wireline interface (such as a USB cable) or a wireless interface supporting for example Bluetooth®. The keypad 1208 can represent a numeric keypad commonly used by phones, and/or a QWERTY keypad with alphanumeric keys. The UI 1204 can further include a display 1210 such as monochrome or color LCD (Liquid Crystal Display), OLED (Organic Light Emitting Diode) or other suitable display technology for conveying images to an end user of the communication device 1200. In an embodiment where the display 1210 is touch-sensitive, a portion or all of the keypad 1208 can be presented by way of the display 1210 with navigation features.

The display 1210 can use touch screen technology to also serve as a user interface for detecting user input. As a touch screen display, the communication device 1200 can be adapted to present a user interface with graphical user interface (GUI) elements that can be selected by a user with a touch of a finger. The touch screen display 1210 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1210 can be an integral part of the housing assembly of the communication device 1200 or an independent device communicatively coupled thereto by a tethered wireline interface (such as a cable) or a wireless interface.

The UI 1204 can also include an audio system 1212 that utilizes audio technology for conveying low volume audio (such as audio heard in proximity of a human ear) and high volume audio (such as speakerphone for hands free operation). The audio system 1212 can further include a microphone for receiving audible signals of an end user. The audio system 1212 can also be used for voice recognition applications. The UI 1204 can further include an image sensor 1213 such as a charged coupled device (CCD) camera for capturing still or moving images.

The power supply 1214 can utilize common power management technologies such as replaceable and rechargeable batteries, supply regulation technologies, and/or charging system technologies for supplying energy to the components of the communication device 1200 to facilitate long-range or short-range portable applications. Alternatively, or in combination, the charging system can utilize external power sources such as DC power supplied over a physical interface such as a USB port or other suitable tethering technologies.

The location receiver 1216 can utilize location technology such as a global positioning system (GPS) receiver capable of assisted GPS for identifying a location of the communication device 1200 based on signals generated by a constellation of GPS satellites, which can be used for facilitating location services such as navigation. The motion sensor 1218 can utilize motion sensing technology such as an accelerometer, a gyroscope, or other suitable motion sensing technology to detect motion of the communication device 1200 in three-dimensional space. The orientation sensor 1220 can utilize orientation sensing technology such as a magnetometer to detect the orientation of the communication device 1200 (north, south, west, and east, as well as combined orientations in degrees, minutes, or other suitable orientation metrics).

The communication device 1200 can use the transceiver 1202 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1206 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1200.

Other components not shown in FIG. 12 can be used in one or more embodiments of the subject disclosure. For instance, the communication device 1200 can include a reset button (not shown). The reset button can be used to reset the controller 1206 of the communication device 1200. In yet another embodiment, the communication device 1200 can also include a factory default setting button positioned, for example, below a small hole in a housing assembly of the communication device 1200 to force the communication device 1200 to re-establish factory settings. In this embodiment, a user can use a protruding object such as a pen or paper clip tip to reach into the hole and depress the default setting button. The communication device 1200 can also include a slot for adding or removing an identity module such as a Subscriber Identity Module (SIM) card. SIM cards can be used for identifying subscriber services, executing programs, storing subscriber data, and so forth.

The communication device 1200 as described herein can operate with more or less of the circuit components shown in FIG. 12. These variant embodiments can be used in one or more embodiments of the subject disclosure.

The communication device 1200 can be adapted to perform the functions of devices 120 and 660 of FIGS. 1-7, the media processor 906, the media devices 908, or the portable communication devices 916 of FIG. 9, as well as the IMS CDs 1001-1002 and PSTN CDs 1003-1005 of FIG. 10. It will be appreciated that the communication device 1200 can also represent other devices that can operate in the systems of FIGS. 1, 6 and 7, communication systems 900-1000 of FIGS. 9-10 such as a gaming console and a media player.

The communication device 1200 shown in FIG. 12 or portions thereof can serve as a representation of one or more of devices 120 and 660 in FIGS. 1-7, communication system 900, and communication system 1000. In particular, device 1200 with display 1210 can be adapted in various embodiments to perform the functions of the second display device, separate from the first display device 111.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 13:
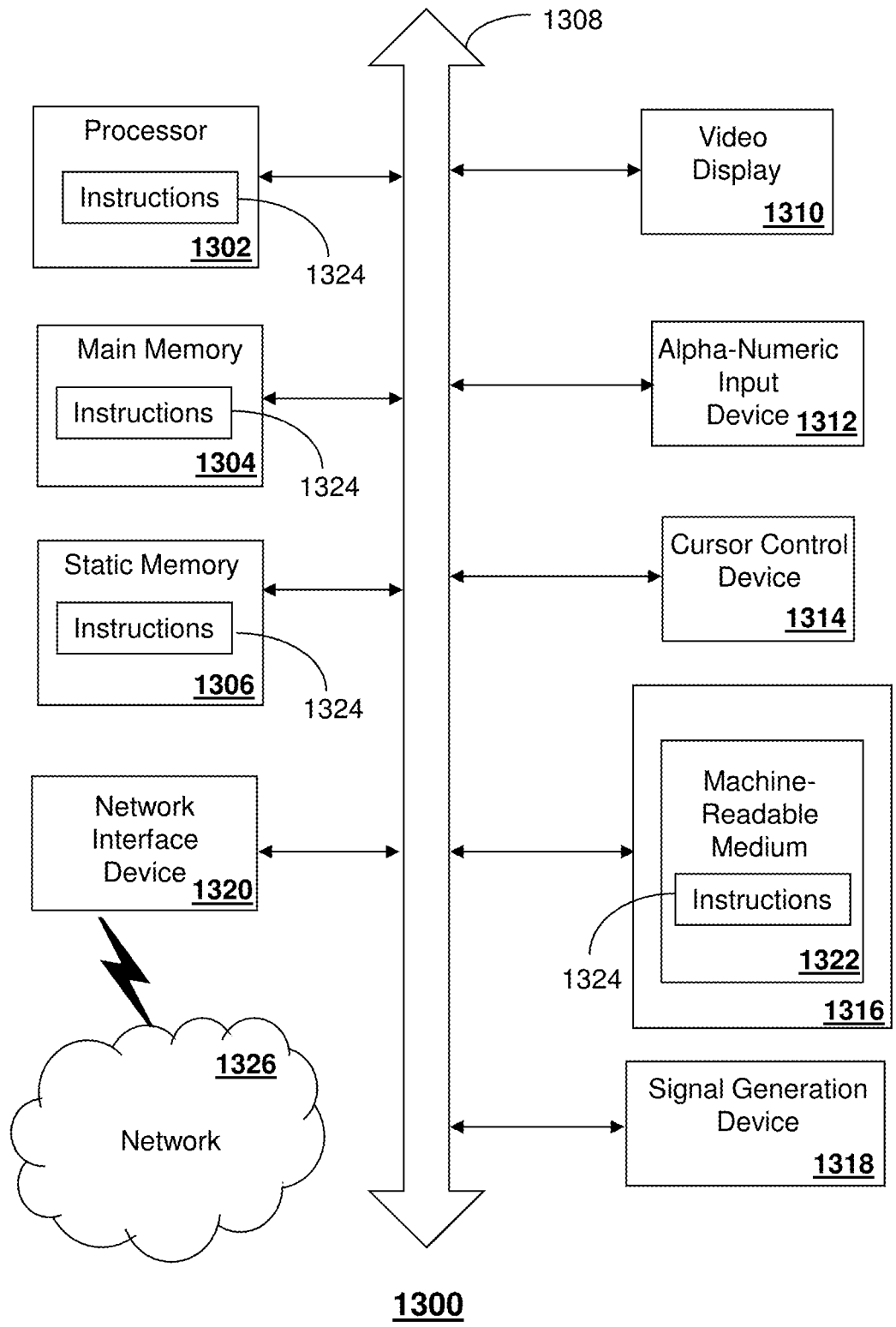
FIG. 13 is a diagrammatic representation of a machine in the form of a computer system within which a set of instructions, when executed, may cause the machine to perform any one or more of the methods described herein.

FIG. 13 depicts an exemplary diagrammatic representation of a machine in the form of a computer system 1300 within which a set of instructions, when executed, may cause the machine to perform any one or more of the methods described above. One or more instances of the machine can operate, for example, as the server 701, 702 or 930, the media processor 112 or 906 and other devices of FIGS. 1-7. In some embodiments, the machine may be connected (e.g., using a network 1326) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1300 may include a processor (or controller) 1302 (e.g., a central processing unit (CPU)), a graphics processing unit (GPU, or both), a main memory 1304 and a static memory 1306, which communicate with each other via a bus 1308. The computer system 1300 may further include a display unit 1310 (e.g., a liquid crystal display (LCD), a flat panel, or a solid state display). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320. In distributed environments, the embodiments described in the subject disclosure can be adapted to utilize multiple display units 1310 controlled by two or more computer systems 1300. In this configuration, presentations described by the subject disclosure may in part be shown in a first of the display units 1310, while the remaining portion is presented in a second of the display units 1310.

The disk drive unit 1316 may include a tangible computer-readable storage medium 1322 on which is stored one or more sets of instructions (e.g., software 1324) embodying any one or more of the methods or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1322 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee), and long-range communications (e.g., WiMAX, GSM, CDMA, LTE) can be used by computer system 1300.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:
  a processing system including a processor;
  a memory that stores executable instructions that, when executed by the processing system, facilitate performance of operations, comprising:
    determining a product preference for a user according to a user profile;
    selecting an advertisement according to the product preference;
    providing media content and the advertisement to a media processor, wherein the media content and the advertisement is to be presented on a first display;
    generating a product recommendation according to the product preference;
    providing the product recommendation to a communication device of the user;
    providing a unique value to the media processor, wherein the media processor inserts the unique value into a closed captioning line of media content, wherein the unique value identifies a commerce event, wherein the media processor provides a first message comprising a prompt for user input in response to presenting the advertisement with the media content on the first display, wherein the closed captioning line is presented simultaneously with presentation of the advertisement on the first display;

receiving, from the media processor in accordance with the user input, a request to provide information regarding an advertised product to the communication device, the communication device being separate from the media processor and having a second display, wherein the user input is provided by a device operating as a remote controller of the first display communicatively coupled to the media processor, and responsive to the user input, the communication device using a first shopping application to identify a second shopping application corresponding to the unique value; and transmitting, to the communication device, the information regarding the advertised product to enable the communication device to execute the first shopping application, wherein the communication device presents a discount for the advertised product, wherein the first shopping application is launched on the communication device without interrupting presentation of the media content, wherein the second shopping application executes on the communication device to engage the user in accordance with the commerce event.

2. The server of claim 1, wherein the operations further comprise receiving from the media processor a second message comprising the user profile, wherein the advertisement is based on the user profile.

3. The server of claim 2, wherein the operations further comprise providing the media content to the media processor.

4. The server of claim 1, wherein:
the operations further comprise facilitating access to the first shopping application for download at the communication device; and
the transmitting, to the communication device, the information regarding the advertised product further enables the communication device to execute the first shopping application to search for the second shopping application in accordance with the unique value.

5. The server of claim 4, wherein the first shopping application, executing on the communication device, performs a table lookup procedure to search for the second shopping application, the second shopping application being a commerce application corresponding to the unique value.

6. The server of claim 1, wherein the request received from the media processor comprises a push notification request, and wherein the server further comprises a push notification server for transmitting a push notification to the communication device.

7. The server of claim 4, wherein the communication device, in accordance with executing the second shopping application, sends a request to a third-party commerce server to perform an e-commerce transaction.

8. The server of claim 7, wherein the e-commerce transaction comprises a purchase of the advertised product.

9. The server of claim 1, wherein the operations further comprise providing the second shopping application for installation at the media processor to detect the unique value inserted into the closed captioning line.

10. The server of claim 9, wherein the second shopping application, executing on the media processor and detecting the unique value, facilitates presentation of the first message on the first display.

11. A non-transitory machine-readable storage medium, comprising executable instructions that, when executed by a processing system including a processor, facilitate performance of operations, comprising:

determining a product preference for a user according to a user profile;

selecting an advertisement according to the product preference;

providing media content and the advertisement to a media processor, wherein the media content and the advertisement is to be presented on a display;

generating a product recommendation according to the product preference;

providing the product recommendation to a mobile communication device of the user;

providing a unique value to the media processor, wherein the media processor inserts the unique value into a closed captioning line of media content, wherein the unique value identifies a commerce event, wherein the media processor provides a first message comprising a prompt for user input in response to presenting the advertisement with the media content on the display;

receiving a push notification request to provide information regarding an advertised product to the mobile communication device separate from the media processor, wherein the push notification request is sent responsive to the user input that had been prompted, wherein the push notification request comprises the product recommendation, wherein the user input is provided by a device operating as a remote controller of the display communicatively coupled to the media processor, and responsive to the user input, the mobile communication device using a first shopping application to identify a second shopping application corresponding to the unique value; and transmitting a push notification regarding the advertised product to the mobile communication device, wherein the push notification includes the unique value, and wherein the first shopping application on the mobile communication device searches for the commerce event based on the unique value for performing an e-commerce transaction, wherein the mobile communication device presents a discount for the advertised product, wherein the first shopping application is launched on the mobile communication device without interrupting presentation of the media content, wherein the second shopping application executes on the mobile communication device to engage the user in accordance with the commerce event.

12. The non-transitory machine-readable storage medium of claim 11, wherein the operations further comprise providing access to the first shopping application for installation on the mobile communication device, wherein the first shopping application is provided by a data management server communicating with the media processor over a network, and wherein in accordance with performing the e-commerce transaction, the mobile communication device communicates with a third-party commerce server separate from the data management server.

13. The non-transitory machine-readable storage medium of claim 12, wherein the first shopping application, executing on the mobile communication device, performs a table lookup procedure to search for the commerce event.

14. The non-transitory machine-readable storage medium of claim 11, wherein the first message comprises a text message.

15. The non-transitory machine-readable storage medium of claim 11 wherein the mobile communication device, in accordance with executing the second shopping application, sends a request to a third-party commerce server to perform the e-commerce transaction.

16. The non-transitory machine-readable storage medium of claim 11, wherein the operations further comprise providing another application for installation at the media processor to detect the unique value inserted into the closed captioning line and facilitate presentation of the first message on the display in accordance with detecting the unique value.

17. A method, comprising:
  determining, by a server including a processor, a product preference for a user according to a user profile;
  selecting, by the server, an advertisement according to the product preference;
  providing, by the server, media content and the advertisement to a media processor, wherein the media content and the advertisement is to be presented on a display;
  generating by the server, a product recommendation according to the product preference;
  providing by the server, the product recommendation to a communication device of the user;
  providing a unique value to the media processor, wherein the media processor inserts the unique value into a closed captioning line of media content, wherein the unique value identifies a commerce event, wherein the media processor provides a first message comprising a prompt for user input in response to presenting the advertisement with the media content on the display;
  receiving, by the server, a push notification request to provide information regarding an advertised product to the communication device separate from a set top box, wherein the push notification request is sent responsive to the user input that had been prompted, wherein the push notification request comprises the product recommendation, wherein the user input is provided by a device operating as a remote controller of the display communicatively coupled to the set top box, and responsive to the user input, the communication device using a shopping application to identify a commerce application corresponding to the unique value; and
  transmitting, by the server, to the communication device a push notification regarding the advertised product, wherein the push notification includes the unique value, and wherein the shopping application on the communication device searches for the commerce event based on the unique value associated with the commerce event, wherein the communication device presents a discount for the advertised product, wherein the shopping application is launched on the communication device without interrupting presentation of the media content,
  wherein the commerce application executes on the communication device to engage the user in accordance with the commerce event.

18. The method of claim 17, wherein the communication device is enabled to communicate with a third-party commerce server in accordance with the information regarding the advertised product.

19. The method of claim 18, wherein the communication device communicates with the third-party commerce server in accordance with executing the commerce application.

20. The method of claim 17, further comprising:
  providing, by the server, the media content to the set top box; and
  facilitating, by the server, access to the shopping application for download at the communication device.

* * * * *